(12) United States Patent
Rossi et al.

(10) Patent No.: US 11,907,760 B2
(45) Date of Patent: Feb. 20, 2024

(54) SYSTEMS AND METHODS OF MEMORY ALLOCATION FOR NEURAL NETWORKS

(71) Applicant: Apple Inc., Cupertino, CA (US)

(72) Inventors: Francesco Rossi, Sunnyvale, CA (US); Marco Zuliani, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1189 days.

(21) Appl. No.: 15/711,781

(22) Filed: Sep. 21, 2017

(65) Prior Publication Data

US 2018/0088996 A1 Mar. 29, 2018

Related U.S. Application Data

(60) Provisional application No. 62/398,897, filed on Sep. 23, 2016.

(51) Int. Cl.
*G06F 9/50* (2006.01)
(52) U.S. Cl.
CPC .................. *G06F 9/5016* (2013.01)
(58) Field of Classification Search
CPC ............. G06F 9/5016; G06N 3/02; G05B 2219/25255
See application file for complete search history.

(56) References Cited

U.S. PATENT DOCUMENTS

| | | | |
|---|---|---|---|
| 8,387,066 B1 * | 2/2013 | Becher ................. | G06F 9/4881 718/106 |
| 8,965,819 B2 | 2/2015 | Tirunagari | |
| 2006/0053421 A1 * | 3/2006 | Dickenson ............ | G06F 9/5016 718/100 |
| 2016/0364644 A1 * | 12/2016 | Brothers ................ | G06N 3/049 |
| 2016/0379115 A1 | 12/2016 | Burger et al. | |
| 2017/0124452 A1 * | 5/2017 | Tucker .................. | G06N 5/048 |
| 2017/0161604 A1 * | 6/2017 | Craddock ............. | G06N 3/063 |
| 2017/0344882 A1 * | 11/2017 | Ambrose .............. | G06N 3/0454 |

FOREIGN PATENT DOCUMENTS

EP  2950481  12/2015

OTHER PUBLICATIONS

Nadathur Satish et al., "Optimizing the use of GPU Memory in Applications with Large data sets", Mar. 18, 2010, 2009 International Conference on High Performance Computing (HiPC) (Year: 2009).*

* cited by examiner

*Primary Examiner* — Markus A. Vasquez
(74) *Attorney, Agent, or Firm* — FLETCHER YODER PC

(57) ABSTRACT

A method may include accessing a data processing architecture associated with a neural network to determine dependencies between intermediate data layers of the neural network; obtaining dimensions of the intermediate data layers in the neural network; calculating a minimum number of data storage portions for executing the neural network based on the dependencies; determining a memory allocation size for each respective data storage portion of the data storage portions based on the dimensions and dependencies; allocating memory on a storage device for each data storage portion in accordance with its respective determined memory allocation size.

20 Claims, 6 Drawing Sheets

SYSTEMS AND METHODS OF MEMORY ALLOCATION FOR NEURAL NETWORKS

CLAIM OF BENEFIT TO PRIOR APPLICATION

This application claims the benefit of U.S. Provisional Application No. 62/398,897, filed Sep. 23, 2016, which is hereby incorporated by reference in its entirety.

TECHNICAL FIELD

Embodiments described herein generally relate to memory allocation and in particular, but without limitation to, systems and methods for memory allocation for neural networks.

BACKGROUND

Machine learning algorithms enable a computer to make predictions about a given data input based on past historical data, often referred to as a training set. For example, consider the task of classifying whether or not an animal is a dog or cat based on its length and height. A training set may include thousands of [height, weight, cat/dog] tuples, such as [10, 6, cat]. The machine learning algorithm may take this data and "learn" the dividing lines between cats and dogs based on height and weight. Then, given an unclassified data entry, the machine learning algorithm determines whether it is a dog or cat and a confidence level of the classification. In another example, a machine learning algorithm may be used for handwriting recognition of numbers. The training set may be individual images classified as a single digit (e.g., [image, 1].)

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

One type of machine learning algorithm well-suited for image classification is a neural network. Artificial neural networks (hereinafter, neural networks) are modeled after biological neural networks. The basic architecture of a neural network includes one or more layers of interconnected nodes beginning with one or more input layers, one or more hidden layers and one or more output layers. The number of layers and the number of nodes per layer may be set as part of the neural network architecture. The settings (e.g., number of layers, connections between nodes of layers, etc.) for the architecture of a neural network are also referred to as hyperparameters.

A node's value may be a function (sometimes referred to as an activation or transfer function) of the weighted sums of one or more nodes' values in a previous layer. An example activation function may be a non-linear function such as the logistic function:

$$f(x) = \frac{1}{1+e^{-x}}.$$

This value, in turn, may be used as part of an input of a node in the next layer—again, with a weight applied to it. The weights may have an initial value that is changed based on the training set that is run through the neural network. The activation function may be one of the hyperparameters, as well as the rate of change of the value.

Figure 1:
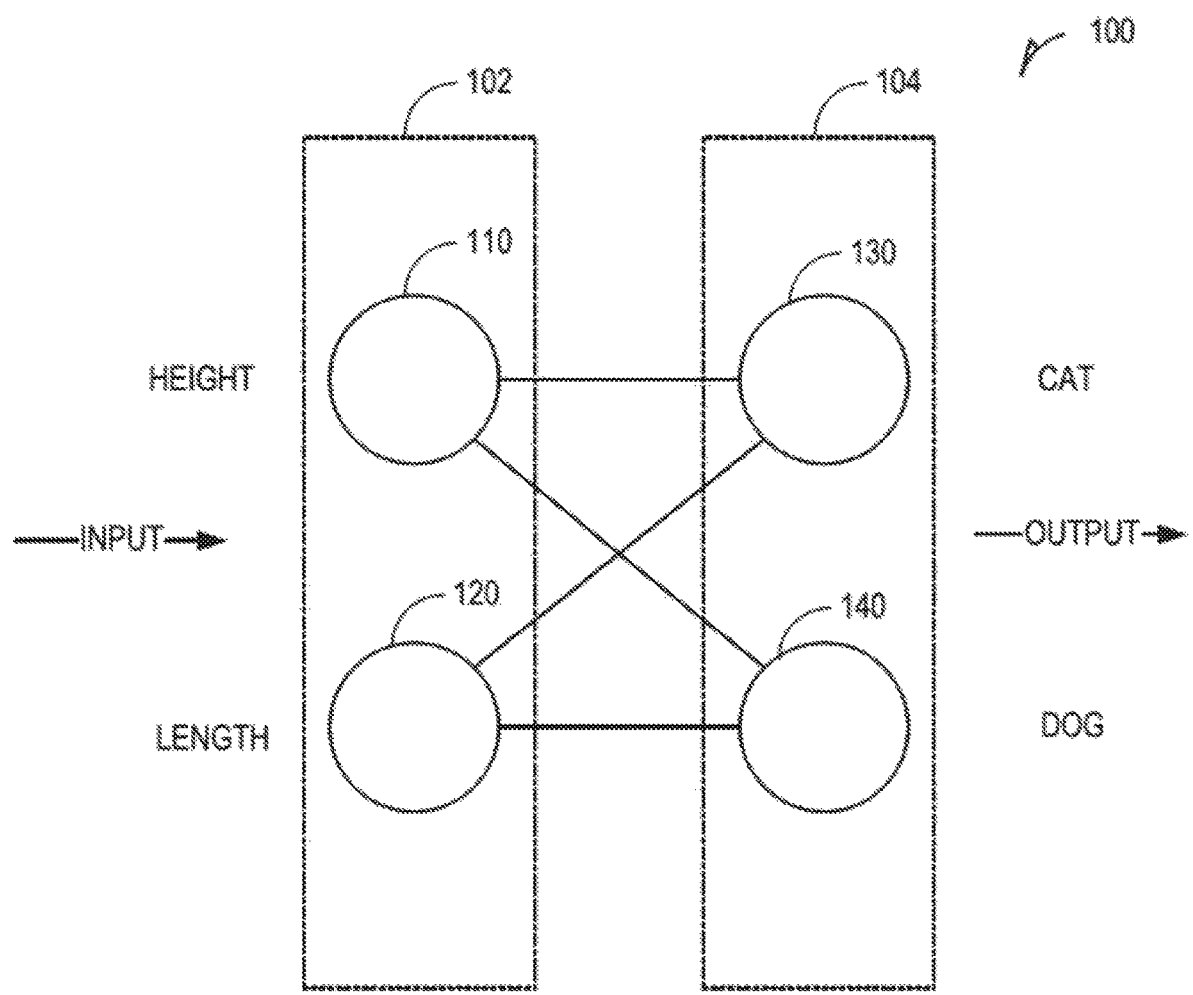
FIG. 1 illustrates a representation of a neural network, according to an example.

FIG. 1 illustrates a representation of a neural network 100 to visualize the architecture of a simplified neural network, according to various examples. The neural network 100 illustrates an input layer 102, with node 110 and node 120, and an output layer 104, with nodes 130 and 140. The neural network 100 does not include a hidden layer for illustration simplicity. The neural network 100 is fully connected because each node in output layer 104 is connected to each node in input layer 102. The neural network 100 illustrates inputs of height and length for nodes 110 and 120, respectively, and outputs of a cat and a dog for nodes 130 and 140, respectively.

The value of node 130 may be expressed as the transfer function of (height*weight $_{node\ 110, node\ 130}$)+(length*weight $_{node\ 120, node\ 130}$). Similarly, the value of node 140 may be expressed as the transfer function of:

(height*weight $_{node\ 110, node\ 140}$)+(length*weight $_{node\ 120, node\ 140}$). When establishing a neural network architecture, the amount of memory needed for any calculations may be known prior to the neural network actually being executed. The amount may be based on the number of nodes and layers and connections between the nodes and layers. In other words, the number of nodes and layers dictates the size of memory needed to store data used in the calculation of the node values.

In an image classification scenario for digital images of digits, the training images may be 20 pixels wide by 20 pixels high and a black luminance level (e.g., range of white to black). Accordingly, the input layer may use 400 nodes, one for each pixel, and the value for each node would be the luminance (or other characteristics) of the pixel. The nodes may be represented in an array or other data structure. The output layer may include 10 nodes, one for each digital image digit from '0' to '9.' The process of training the neural network may include randomizing the initial weights of the nodes in the hidden layers and running the first image through the network to see the values of the nodes in the output layer. For example, the output of the node that signifies a one may be 0.6 indicating a 60% chance the hand drawn image was a one.

After a forward pass through the network with an image, the weights may be modified through a process called backpropagation. The amount of adjustment per training image, as well as the function to modify the weights, may be set according to the architecture. Over time, the process of evaluating the output nodes and adjusting the weights through backpropagation increases the accuracy of the neural network. Thus, after the training is complete, the output node signifying a one, may be 0.95, indicating a much better accuracy level.

An image's size may be represented as a three-dimensional (3D) volume of height, width, and depth. The depth represents the different values for a given pixel. For example, each pixel in an image may have a red, green, and blue value. Even just one fully connected node in a 1024× 1024×3 image may have 3,145,728 weights. Furthermore, many more nodes are used in neural networks. Accordingly, the amount of memory needed for fully-connected neural networks becomes undesirable when classifying full-sized color images on a mobile device.

In order to facilitate more efficient classification of larger images, a more specialized neural network may be used, such as a convolutional neural network. A convolutional neural network builds on the premise of the neural network described above, but uses different types of layers made up of nodes existing in three dimensions; with dimensions that may change between layers. In a convolutional neural network, a node in a layer may only be connected to a subset of the nodes in a previous layer. The final output layer may be fully connected and be sized according to the number of classifiers. For example, continuing the digital image digit classification example above, the final output layer may have dimensions of [1×1×10]. Similarly, a convolutional neural network that identifies 500 different objects (e.g., cats, dogs, people, bridges, etc.) in an image may be [1×1×500].

Figure 2:
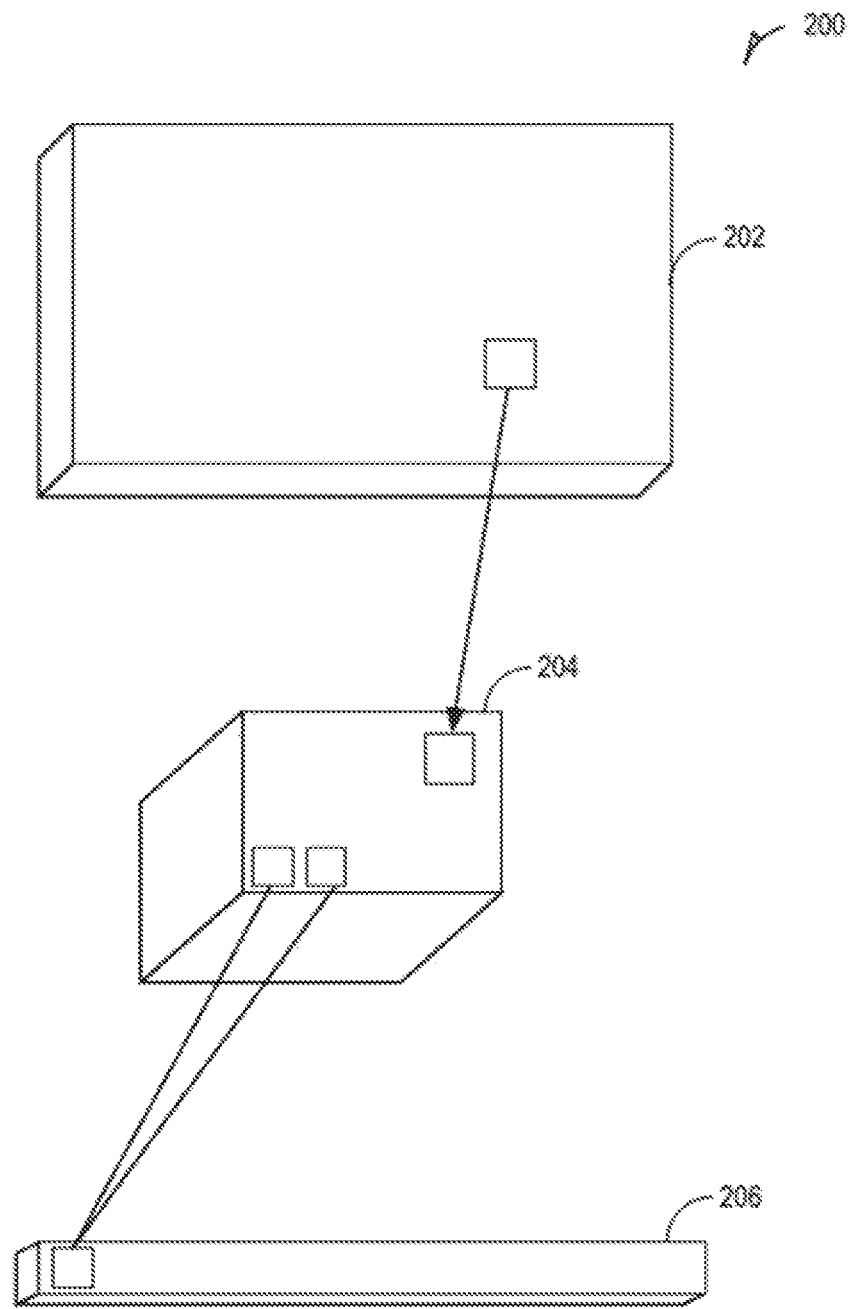
FIG. 2 illustrates a visualization of a simplified convolutional neural network, according to an example.

FIG. 2 illustrates a visualization of a simplified convolutional neural network 200, according to an example. Convolutional neural network 200 includes input volume 202, convolutional layer 204, and output layer 206. In contrast to the neural network of FIG. 1, the convolutional neural network 202 operates in three dimensions at each layer—with the dimensionality of the volumes changing at each of the layers.

A convolutional neural network architecture may include various combinations—in some instances, multiples of each—and orders of the following types of layers: the input layer, convolutional layers, pooling layers, rectified linear unit layers (ReLU), and fully connected layers. Part of the process of a convolutional neural network is to take a set of filters (or kernels) that are iterated over the input image according to a stride parameter. The filters are often a few pixels by a few pixels. The depth of a convolutional layer may equal the number of filters used, in various examples, while the height and width remain the same as the input volume. A ReLU layer may apply a different activation function, but otherwise leave the size of the volume unchanged. A pooling layer may down sample an input volume thereby changing its width and height, but leaving the depth unchanged. As one of ordinary skill in the art would recognize, the sizes of the different volumes at each layer may be mathematically determined given the hyperparameters of a convolutional neural network.

Convolutional neural networks are often run on cloud-based computing platforms due to the volume of data being processed. In such instances, memory management is often an after-thought because cloud-based systems do not have practical memory concerns (e.g., more computing power/memory is readily available). In contrast, storing all the weights and resulting node values of convolutional neural network in memory on a memory limited device (e.g., a mobile phone) may not be possible or practical. One approach is to dynamically allocate and deallocate memory at each layer as the convolutional neural network executes. This approach has performance drawbacks due to the allocations and deallocations.

The methodology described herein significantly reduces dynamic memory allocation and deallocation by reusing memory portions as well as allocating all memory before the neural network is run. This methodology has the benefit of both reducing memory footprint (as compared to allocating all necessary memory) and improving performance of the neural network (as compared to allocation and deallocation techniques). Additionally, real-time operating system (RTOS) often do not allow dynamic memory allocations. Thus, using the methodologies described herein, a convolutional neural network may be run on a RTOS.

Figure 3:
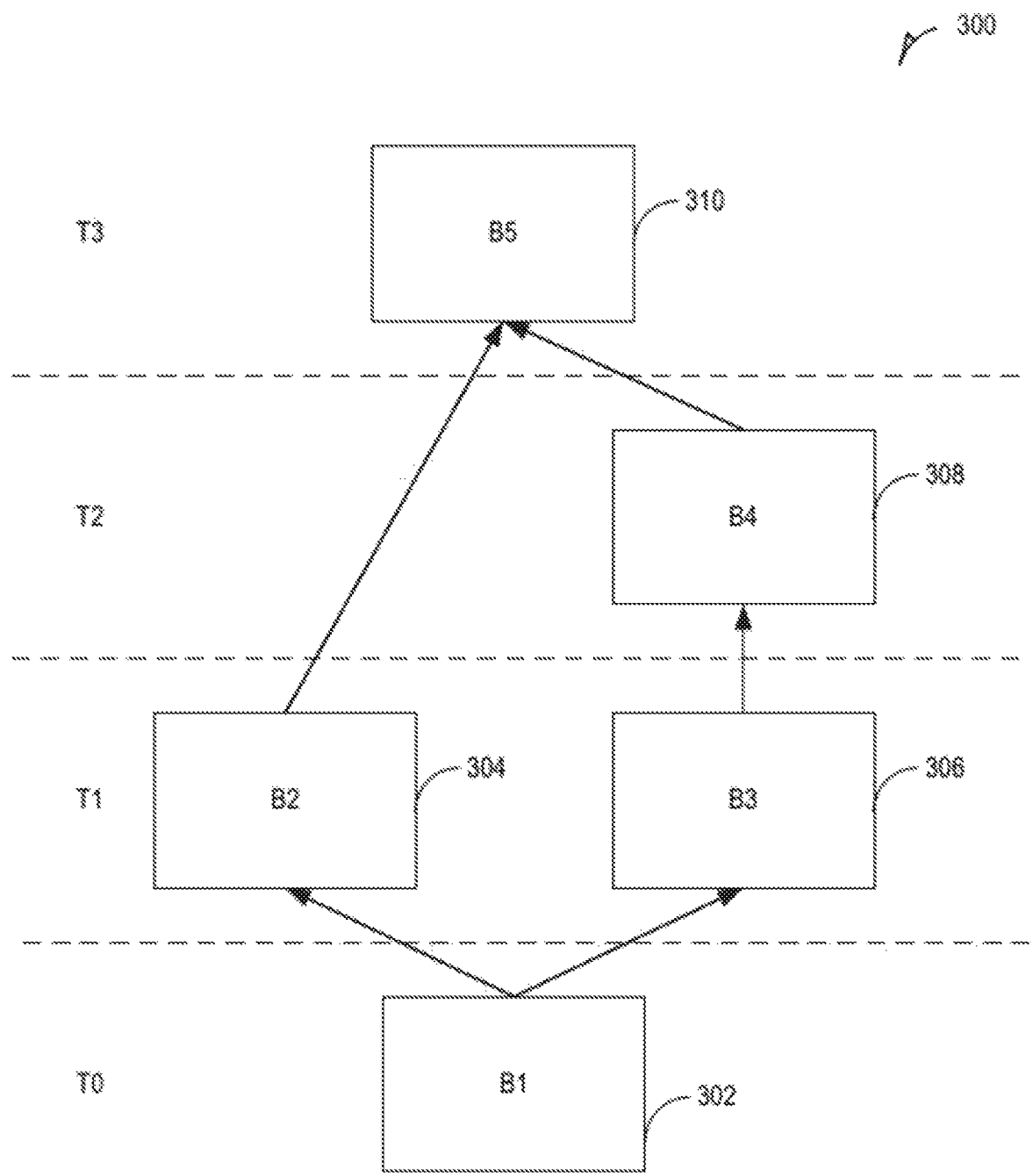
FIG. 3 illustrates a simplified schematic of a convolutional neural network, according to an example.

FIG. 3 illustrates a simplified schematic of a convolutional neural network 300, according to an example. Convolutional neural network 300 illustrates intermediate data layers 302-310. The intermediate data layers are illustrated as 2D objects for simplicity, but in actuality may be 3D input volumes as discussed above. The intermediate data layers 302-310 may be different types of layers such as convolutional layers, ReLU layers, etc. Accordingly, different intermediate data layers may have different dimensions. Different executing computing architectures may store the intermediate data layers in different formats. For example, many convolutional neural networks are processed on graphics processing units (GPUs) and so the 3D input volumes are often represented and stored as 2D textures.

Convolutional neural network 300 is illustrated along a vertical temporal axis starting at t0 and ending at t3. The axis illustrates the different, relative, times intermediate data layers may be processed by a computing device. For example, intermediate data layer 302 may be processed first, and then both intermediate data layer 304 and intermediate data layer 306 are processed in parallel at t1.

Convolutional neural network 300 also illustrates the dependencies between different intermediate data layers. Thus, intermediate data layer 304 and intermediate data layer 306 both use the output of intermediate data layer 302; intermediate data layer 308 uses the output of intermediate data layer 306; and intermediate data layer 310 uses the output of intermediate data layer 308 and intermediate data layer 304. The hyperparameters and architecture—number of layers and how the layers are connected—of convolutional neural network 300 may be stored with the network as metadata in a separate stored file.

In various examples, convolutional neural network 300 may be executed on a single computing device (e.g., mobile device, laptop computer, desktop computer). Convolutional neural network 300 may be part of another computing application, such as a photo application. For examples, a user may open the photo application and import a new photo. The new photo may be used as input to convolutional neural network 300. The output of convolutional neural network 300 may be a vector where each entry in the vector corresponds to a classification. For example, the first entry may be for a cat and the value of the entry indicates the percentage chance the new photo includes a cat, the second entry may be for a dog, etc. The results of convolutional neural network 300 may be stored as metadata for the new image. Accordingly, when a user searches for "cat," the photo application may retrieve the new photo if the percentage is above a certain threshold.

The dependencies between the layers of convolutional neural network 300 may be used to deduce the minimum number of memory allocations needed to execute the convolutional neural network. This is because once the dependencies are known, one can determine at any given execution point whether or not the output from a data layer will be needed in the future. If the output is needed, then a memory allocation may be required to hold the output until whatever intermediate data layer needs it has used the output. The minimum number of memory allocations is thus the largest number of memory allocations needed to hold the depended upon outputs during execution of the convolutional neural network. A visualization of the results of the deduction process is illustrated in FIG. 4.

Figure 4:
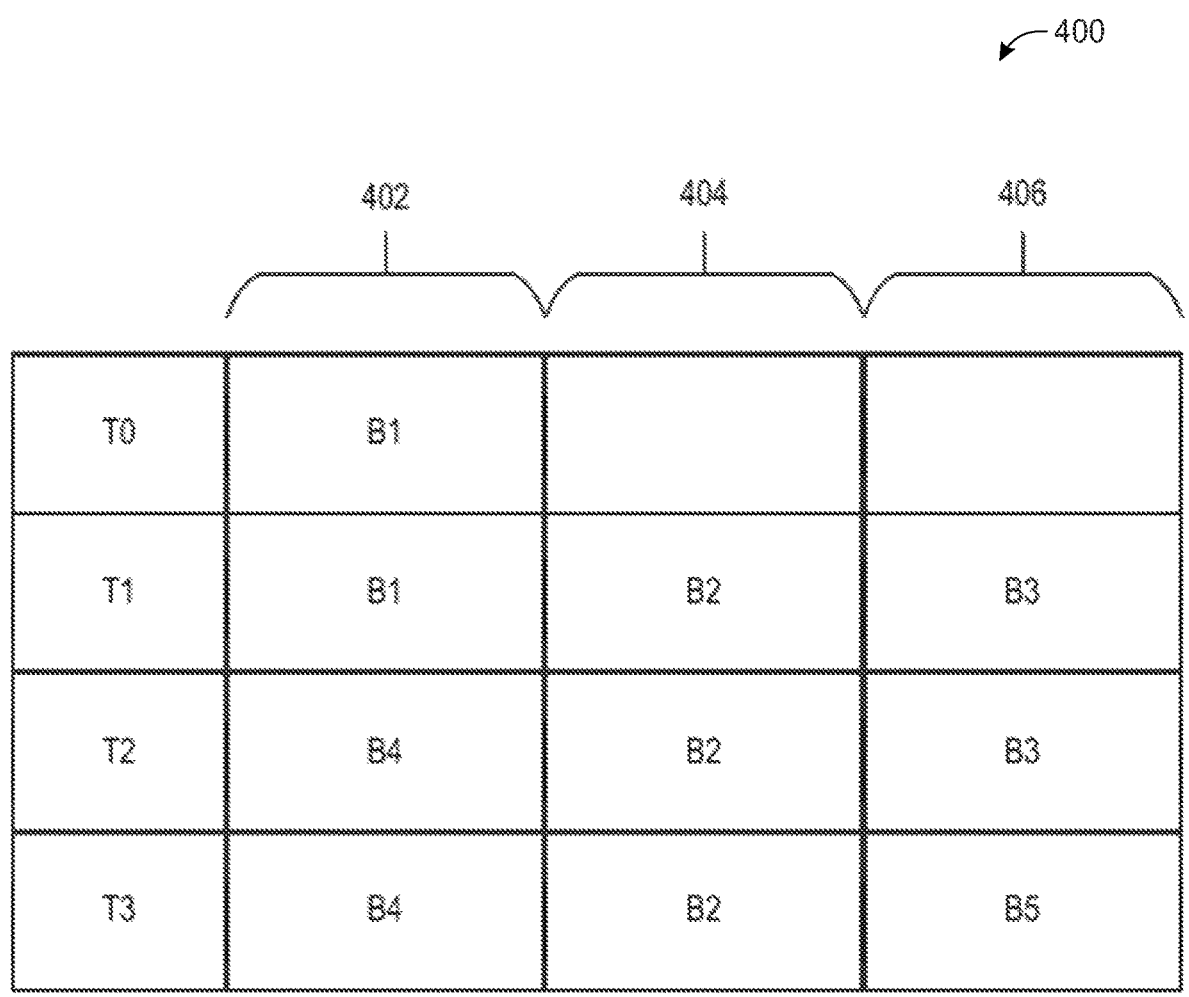
FIG. 4 illustrates a table 400 of memory allocations, according to an example.

FIG. 4 illustrates a table 400 of memory allocations, according to an example. The rows of table 400 correspond to times t0 through t3. The columns of table 400 represent three different memory allocations, memory allocation 402, memory allocation 404, and memory allocation 406. The labels B1, B2, B3, B4, and B5 correspond to intermediate data layer 302, intermediate data layer 304, intermediate data layer 306, intermediate data layer 308, and intermediate data layer 310.

The following discussion references times (e.g., t0) as if the convolutional neural network was actually running. However, a computer program (e.g., the photo application) may perform the deduction process without actually running the convolutional neural network given dependency and relative order of execution time information. The dependency information may be stored in a number of different formats such as trees, tables, etc. The dependency information may be included as a metadata or header data with a convolutional neural network. For example, the dependency information for convolutional neural network 300 may be represented as:

B1: B2, B3
B2: B5
B3: B4
B4: B5
B5: Null

In other words, the output of B1 is used by B2 and B3, the output of B2 is used by B5, etc.

Beginning at t0, a first memory allocation, memory allocation 402, is used to hold the data for B1. Then, at t1 both intermediate data layer 304 (B2) and intermediate data layer 306 (B3) need memory allocations. Accordingly, a check may be performed to see what is stored in memory allocation 402. As just stated, B1 is currently stored in memory allocation 402. Then, the dependency information may be accessed to see if B1 is used by other intermediate data layers. In this case, B1 is used by both B2 and B3. Accordingly, memory allocation 402 may not be assigned to B2 or B3. Consequently, two new memory allocations are needed, memory allocation 404 and memory allocation 406. These allocations are assigned B2 and B3, respectively.

Moving to t2, intermediate data layer 308 (B4) needs a memory allocation. Again, a check may be made to see if an existing memory allocation may be reused. B1 is still in memory allocation 402, but because both B2 and B3 are now complete, the data from B1 is not needed. Accordingly, memory allocation 402 may be reassigned to B4. Similarly, at t3, memory allocation 406 may be reassigned to B5 because B3 is no longer needed. Therefore, based on the dependency information, it is deduced that a minimum number of three memory allocations is needed to execute the convolutional neural network 300—the largest number needed at any point after walking through the dependency tree (e.g., performing a mock execution of the convolutional neural network).

The computer program may also determine which intermediate data layers are assigned to a memory allocation during execution. For example, both B1 and B4 were used by memory allocation 402. The assignment information may be determined at the same time it is determined how many memory allocations are needed.

Next, the needed memory storage size of each of the minimum number of memory allocations may be determined. Different computing architectures may allocate memory in different manners. For example, some computing architectures permit linear memory allocations. Similarly, different architectures have different requirements about the minimum or maximum size of memory allocations. Thus, the following discussion is discussed within the context of a generic architecture, but in many instances the precise amount of memory may be dictated according to the underlying executing architecture.

The computing program setting up the convolutional neural network may iterate through each memory allocation to determine the amount of memory storage to reserve. Thus, with reference back to FIG. 3, the computer program may examine the underlying intermediate data layers of B1 and B4. As discussed previously, each intermediate data layer may be considered a 3D input volume. Accordingly, the memory storage needed for an intermediate data layer may be dictated by the product of the dimensions of the intermediate data layer and the size of the data at entry point in the volume.

For example, consider that convolutional neural network 300 takes 8-bit color (24 total bits, 8-bits for each color channel), 1280×960 resolution-sized images as an input. Further consider that B1 is the intermediate data layer that holds the initial image. Thus, the 3D volume would be 1280×960×3—one depth channel for each color channel. The size of each point in the volume is 1 byte, therefore, the total amount of memory space needed is 3.69 million bits, or approximately 0.46 megabytes. B4 may be a convolutional layer that uses 12 filters, which may result in an input volume of [1280×960×12]. The weights for operating on this layer may also be stored as 1 byte, thereby needing a total of approximately 1.39 megabytes. Accordingly, the size of memory allocation 402 may be 1.39 megabytes—the larger of 0.46 and 1.39.

Some computer architectures may permit memory allocation using linear memory. In such instances, the size of the memory allocation may be based on the maximum total size of an intermediate data layer for any layers that are to reuse the memory allocation. For example, $\max(W_{B1}W_{B4})$. In other instances, where textures or linear memory may not be used, the size may be based on both the maximum width and height of the storage texture. For example, $\max(W_{B1}H_{B1}, W_{B4}H_{B4})$. The allocated memory space needed may also take into account depth information of a volume. For example, a [32×32×3] volume may be thought of as three, consecutive [32×32] arrays (e.g., a [32×96]) volume when determining the size of memory allocations.

Figure 5:
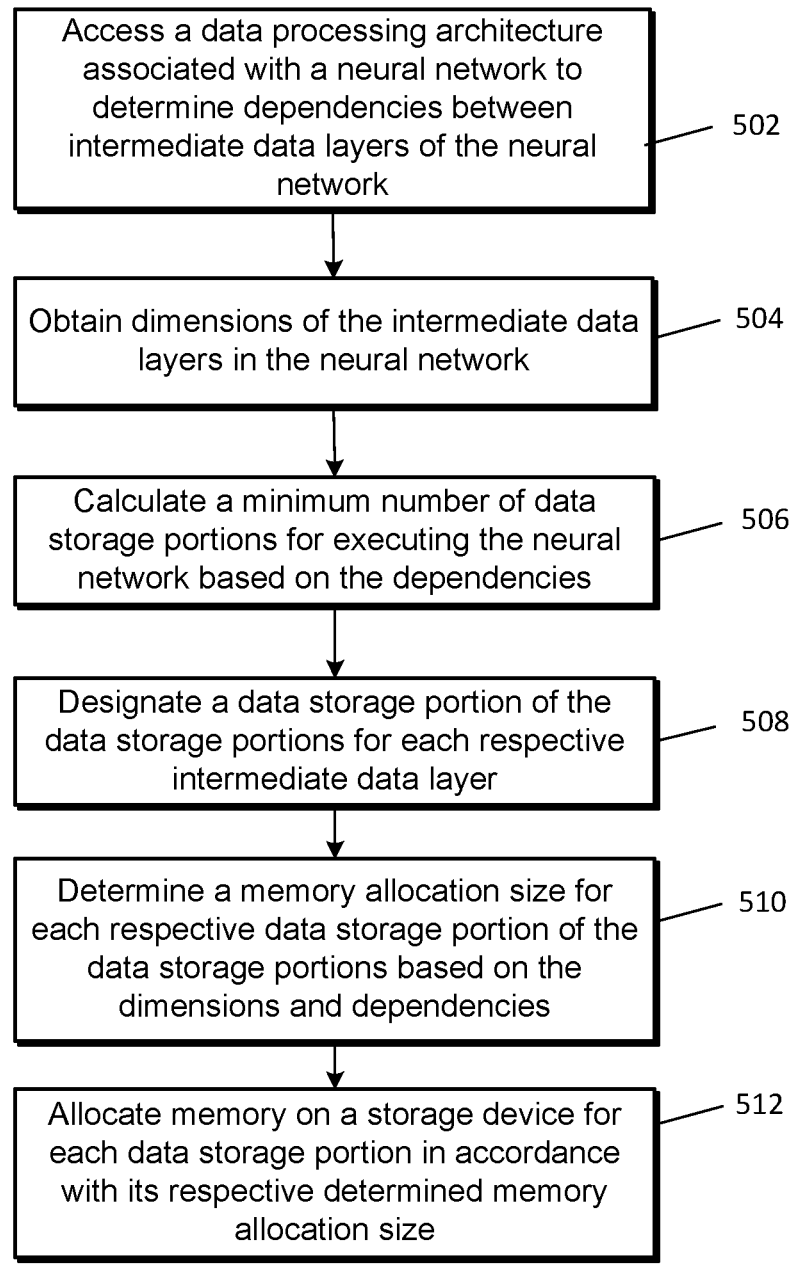
FIG. 5 illustrates a flowchart of a method of determining memory allocations prior to executing a convolutional neural network, according to an example.

FIG. 5 illustrates a flowchart of a method of determining memory allocations prior to executing a convolutional neural network, according to an example. The method may be performed by a processor configured by executing instructions stored on a computing device.

At operation 502, in an example, a data processing architecture associated with a neural network may be accessed to determine dependencies between intermediate data layers of the neural network. In an example, the neural network is a convolutional neural network. The data processing architecture may be stored as metadata, etc. The data processing architecture may identify the number of intermediate data layers, dependencies between the layers, the dimensions (e.g., height, width, depth) of each layer, and the order of execution of the layers. In some examples, the neural network may provide an application programming interface that may be queried for the architecture. The architecture may be accessed before forward or backward passes of the neural network are executed on one or more processors (e.g., general purpose, graphical processing units, etc.).

At operation 504, in an example, the dimensions of the neural network may be obtained. In some examples the sizes of the intermediate data layers are obtained from the metadata. In some examples, the sizes of the intermediate data layers are calculated based on hyperparameters for the neural network.

At operation 506, in an example, the minimum number of data storage portions (e.g., memory allocations) for executing the neural network is determined based on the dependencies. The minimum number of data storage portions may be deduced from the order of the intermediate data layers within the neural network. For example, if three later intermediate data layers use data from an earlier intermediate data layer, the data in the earlier intermediate data layer may be stored at least until the execution of the three later intermediate data layers. In an example, the minimum number of dependencies is stored as part of the metadata for the neural network. Further detail of how to determine the minimum number of data storage portions is described above in the context of FIGS. 3 and 4.

At operation 508, in an example, a data storage portion of the data storage portions is designated for each respective intermediate data layer. The designations may be determined by traversing the architecture as if the neural network was run to determine which intermediate data layer is stored in which data storage portion as the neural network would be run. In some examples, more than one intermediate data layer may be designated to a data storage portion. In some examples, different data storage portions are designated for different intermediate data layers. The resulting designations may be stored as a table that identifies the intermediate data layer and the data storage portion designated for the intermediate data layer. Further detail of how to designate data storage portions for intermediate data layers is described above in the context of FIGS. 3 and 4.

At operation 510, in an example, a memory allocation size for each respective data storage portion is determined based on the dimensions and dependencies. For example, the dependencies may dictate which intermediate data layer are assigned to the data storage portions as discussed above. Then, the dimensions of the intermediate data layer(s) assigned to the respective data storage portion may be examined to determine the largest intermediate data layer by volume. The memory allocation size for the respective data storage portion may be set to at least the size of the largest intermediate data layer. The type of executing environment may affect the memory allocation size. For example, the memory allocation size may be more than the size of the largest intermediate data layer if memory may not be allocated using textures or linearly.

At operation 512, in an example, memory on a storage device is allocated for each data storage portion in accordance with its respective determined memory allocation size. The allocations may be made prior to the neural network being executed and not change until after the neural network is done executing. After allocation, the designation table between intermediate data layers and data storage portions may be updated to include the memory addresses for the allocated memory. In an example, the memory for the data storage portions is allocated as a contiguous block, but virtually split into the number of memory storage portions. During execution of the neural network, a pointer may be moved around the block corresponding to the memory portions in the contiguous block.

Although the above disclosure is described within the context of a single neural network, the methodology may be extended to running multiple neural networks in parallel as part of a pipeline process. In other words, pre-allocated memory storage locations may be shared across neural networks without the need for dynamic memory allocation/deallocation. The same deduction process of how many data storage portions are needed for a single neural network may be used for multiple neural networks if the timing of execution and layer dependency information is examined for multiple neural network at the same time. This may lead to reductions in memory usage when running two or more neural networks in parallel—even more than simply using the method of FIG. 5 independently for each neural network.

The method of FIG. 5 may be performed on a device separate (referred to as a configuration device for labeling purposes) from the device the neural network is executed upon (the executing device for labelling purposes). For example, a configuration device that has a specific executing architecture (e.g., single core CPU, multicore CPU, GPU generation, etc.) may run the method above. The results of the method—such as the number of memory portions, the size of each, how to allocate the memory (linear, etc.)—may be stored, at manufacturing time, onto executing devices that match the configuration device's executing architecture.

In some examples, the configuration device may load multiple different configurations profiles and the run the method for each configuration. Again, the results of the method may be stored onto devices that match the different configurations. Accordingly, when the executing device runs the neural network, the previously stored memory allocation data may be accessed and used to allocate the memory before run time of the neural network (e.g., a photo application classifier).

In either case, the determined memory allocation configuration for each different set of executing architecture may be stored in a database or other data storage for later use as memory allocation configuration data. The database may be queried using the executing architecture (e.g., whether a CPU is running the neural network or a GPU) to retrieve the appropriate configuration data. Thus, an executing device may request the configuration from a remote server after manufacture.

The method of FIG. 5 may also be performed post-manufacturer. For example, the method may be performed during the initialization of the executing device, such as when as a user starts up the device for the first time. The method may also be performed when an application that uses the neural network is executed. In an example, the application may request the memory allocation determination from a remote server.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples such as the method shown in FIG. 5, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein such as the method shown in FIG. 5 and described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies as shown in FIG. 5 and described herein.

Figure 6:
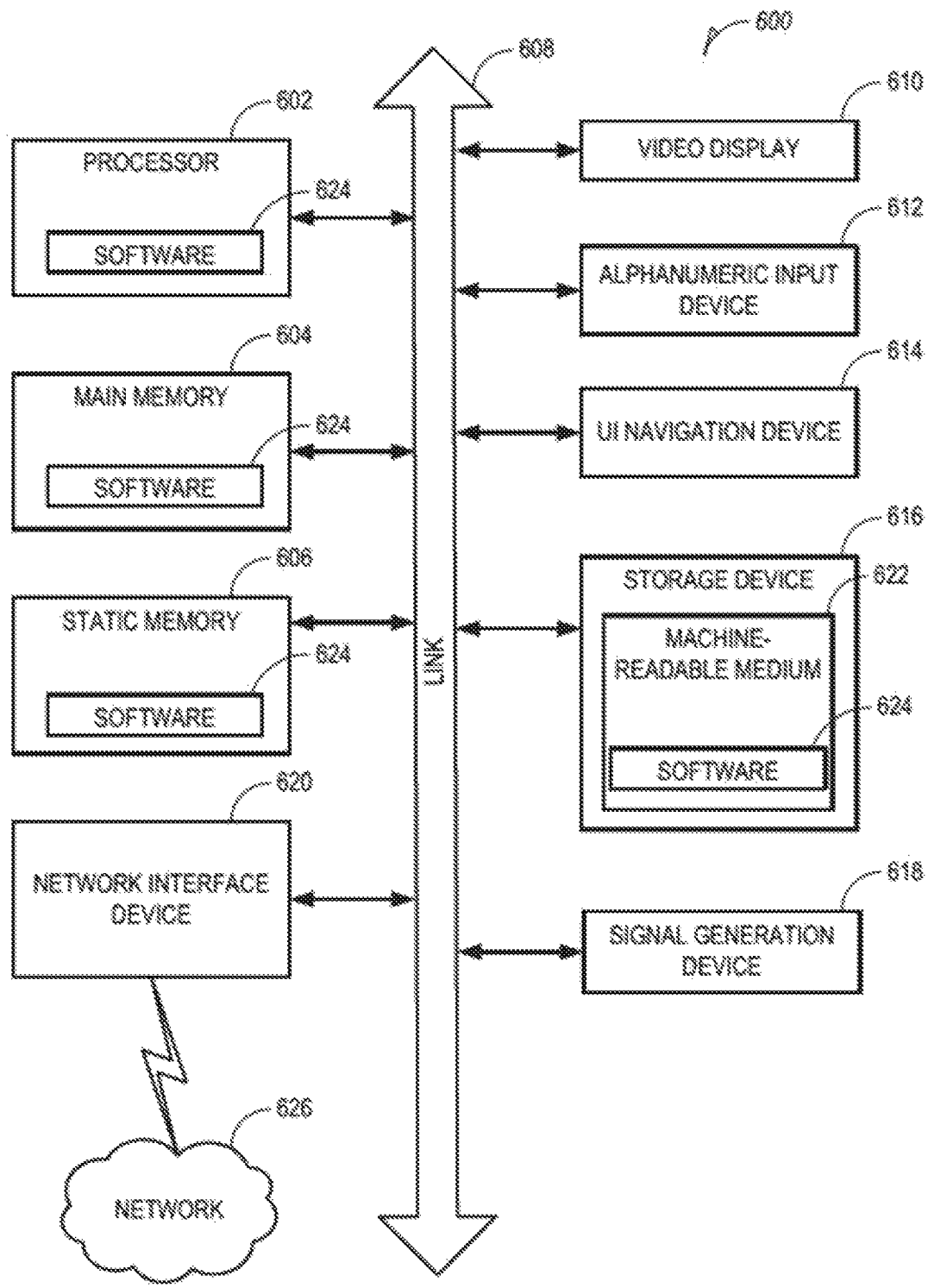
FIG. 6 is a block diagram illustrating an example machine upon which any one or more of the techniques (e.g., methodologies) discussed herein may be performed, according to an example.

FIG. 6 is a block diagram illustrating a machine in the example form of a computer system 600, within which a set or sequence of instructions may be executed to cause the machine to perform any one of the methodologies discussed herein such as shown in FIG. 5 and described herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine to implement the methodologies as described herein. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. For instance, storage device 616 may store instructions 624 that when executed cause the computing system to perform the method shown in FIG. 5 and described herein. The stored instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
    accessing a data processing architecture associated with a neural network to determine dependencies between intermediate data layers of the neural network, the intermediate data layers comprising interconnected nodes of the neural network;
    obtaining dimensions of the intermediate data layers in the neural network;
    calculating a minimum number of data storage portions for executing the neural network based on the dependencies, by:
        segmenting the neural network into time-based processing slices;
        for each time-based processing slice, identifying a number of intermediate data layers needed during execution of the neural network at the time-based processing slice; and
        defining the minimum number of data storage portions to equal a largest number of the identified numbers of intermediate data layers needed during execution of the neural network at the time-based processing slices, wherein each data storage portion comprises a memory location configured to store, during execution of the neural network, at least one of the intermediate data layers based on the dependencies;
    assigning each of the intermediate data layers to one of the minimum number of data storage portions;
    determining a memory allocation size for each respective data storage portion of the data storage portions based on the dimensions and dependencies;
    allocating memory on a storage device for each data storage portion in accordance with its respective determined memory allocation size.

2. The method of claim 1, further comprising:
    for each respective intermediate data layer of the intermediate data layers:
    designating a data storage portion of the data storage portions for the respective intermediate data layer, wherein the data storage portions are stored on a single data storage device.

3. The method of claim 2, wherein a first data storage portion of the data storage portions is designated for a first intermediate data layer and a second data storage portion is designated for a second intermediate data layer.

4. The method of claim 2, wherein a first data storage portion is designated for a plurality of intermediate data layers.

5. The method of claim 4, further comprising determining a memory allocation size for the first data storage portion based on the dimensions of the plurality of intermediate data layers.

6. The method of claim 5, wherein the memory allocation size for the first data storage portion is based on a largest total size of an intermediate data layer in the plurality of intermediate data layers that are assigned to the first data storage portion.

7. The method of claim 1, wherein allocating memory on the storage device for each memory data storage portion in accordance with its respective allocation size comprises:
    linearly allocating the memory on the storage device for a respective memory portion.

8. The method of claim 1, wherein allocating memory on the storage device for each memory data storage portion in accordance with its respective allocation size comprises:
    allocating a single contiguous block of memory on the storage device.

9. The method of claim 1, wherein accessing the data processing architecture associated with the neural network comprises:
    accessing metadata of the neural network that identifies the intermediate data layers and data dependencies between the intermediate data layers.

10. The method of claim 9, wherein the dimensions of the intermediate data layers are stored in the metadata.

11. The method of claim 1, wherein the determined memory allocation size for each respective data storage portion is stored as memory allocation configuration data associated with an executing architecture.

12. The method of claim 11, wherein the memory allocation configuration data is stored on a plurality of computing devices with the same executing architecture.

13. A non-transitory computer readable medium comprising instructions, which when executed by at least one processor, configure the processor to perform operations comprising:
    accessing a data processing architecture associated with a neural network to determine dependencies between intermediate data layers of the neural network, the intermediate data layers comprising interconnected nodes of the neural network;
    obtaining dimensions of the intermediate data layers in the neural network;
    calculating a minimum number of data storage portions for executing the neural network based on the dependencies, by:
        segmenting the neural network into time-based processing slices;
        for each time-based processing slice, identifying a number of intermediate data layers needed during execution of the neural network at the time-based processing slice; and
        defining the minimum number of data storage portions to equal a largest number of the identified numbers of intermediate data layers needed during execution of the neural network at the time-based processing slices, wherein each data storage portion comprises a memory location configured to store, during execution of the neural network, at least one of the intermediate data layers based on the dependencies;
    assigning each of the intermediate data layers to one of the minimum number of data storage portions;

determining a memory allocation size for each respective data storage portion of the data storage portions based on the dimensions and dependencies;

allocating memory on a storage device for each data storage portion in accordance with its respective determined memory allocation size.

14. The non-transitory computer readable medium of claim 13, further comprising instructions, which when executed by the at least one processor, further configure the processor to perform operations comprising:

for each respective intermediate data layer of the intermediate data layers:

designating a data storage portion of the data storage portions for the respective intermediate data layer.

15. The non-transitory computer readable medium of claim 14, wherein a first data storage portion of the data storage portion is designated for a first intermediate data layer and a second data storage portion is designated for a second intermediate data layer.

16. The non-transitory computer readable medium of claim 14, wherein a first data storage portion is designated for a plurality of intermediate data layers.

17. A system comprising:

a storage device;

at least one processor, comprising instructions, which when executed by the at least one processor, configure the processor to perform operations comprising:

accessing a data processing architecture associated with a neural network to determine dependencies between intermediate data layers of the neural network;

obtaining dimensions of the intermediate data layers in the neural network, the intermediate data layers comprising interconnected nodes of the neural network;

calculating a minimum number of data storage portions for executing the neural network based on the dependencies, by:

segmenting the neural network into time-based processing slices;

for each time-based processing slice, identifying a number of intermediate data layers needed during execution of the neural network at the time-based processing slice; and defining the minimum number of data storage portions to equal a largest number of the identified numbers of intermediate data layers needed during execution of the neural network at the time-based processing slices, wherein each data storage portion comprises a memory location configured to store, during execution of the neural network, at least one of the intermediate data layers based on the dependencies;

assigning each of the intermediate data layers to one of the minimum number of data storage portions;

determining a memory allocation size for each respective data storage portion of the data storage portions based on the dimensions and dependencies;

allocating memory on the storage device for each data storage portion in accordance with its respective determined memory allocation size.

18. The system of claim 17, the operations further comprising:

for each respective intermediate data layer of the intermediate data layers:

designating a data storage portion of the data storage portions for the respective intermediate data layer.

19. The system of claim 18, wherein a first data storage portion of the data storage portion is designated for a first intermediate data layer and a second data storage portion is designated for a second intermediate data layer.

20. The system of claim 18, wherein a first data storage portion is designated for a plurality of intermediate data layers.

* * * * *